United States Patent
Komiya

(12) 
(10) Patent No.: US 6,925,795 B2
(45) Date of Patent: Aug. 9, 2005

(54) CABLE OR THE LIKE PROTECTION AND GUIDE DEVICE

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 68 days.

(21) Appl. No.: 10/694,270

(22) Filed: Oct. 27, 2003

(65) Prior Publication Data

US 2004/0103636 A1 Jun. 3, 2004

(30) Foreign Application Priority Data

Nov. 28, 2002 (JP) ........................................ 2002-346154

(51) Int. Cl.$^7$ ............................................ F16G 13/16
(52) U.S. Cl. ............................ 59/78.1; 59/900; 248/49
(58) Field of Search .................... 59/78.1, 900; 248/48, 248/50

(56) References Cited

U.S. PATENT DOCUMENTS

| | | | |
|---|---|---|---|
| 3,779,003 A | | 12/1973 | Boissevain et al. |
| 4,590,961 A | * | 5/1986 | Schumann .................. 59/78.1 |
| 4,800,714 A | * | 1/1989 | Moritz ........................ 59/78.1 |
| 4,833,876 A | * | 5/1989 | Kitao et al. .................... 248/49 |
| 5,771,676 A | * | 6/1998 | Komiya et al. ............... 59/78.1 |
| 6,176,072 B1 | * | 1/2001 | Weber ........................ 59/78.1 |
| 6,550,232 B1 | * | 4/2003 | Achs et al. .................. 59/78.1 |

FOREIGN PATENT DOCUMENTS

JP    2000-055140    2/2000

* cited by examiner

*Primary Examiner*—David Jones
(74) *Attorney, Agent, or Firm*—Woodling, Krost and Rust

(57) ABSTRACT

To provide a cable or the like protection and guide device that does not disperse dust particles such as wear particles generated by slide or friction between a cable or the like and link frame bodies. A number of link frame bodies (11) articulably connected to each other in the longitudinal direction of the device in a state where a cable or the like (14) are accommodated and hermetically sealed, each comprise a pair of link plate (23) disposed on both sides of the cable or the like, and connecting rods (22, 24) bridged across the link plates on the bend outer peripheral side and on the bend inner peripheral side, respectively. Between at least the bend outer peripheral side of the link plate and the connecting rod (24) bridged on the bend outer peripheral side is openably provided a sealing structure by concave and convex fitting (48, 49, 148, 149, 148, 149). Thus, the respective frame bodies are reliably hermetically sealed by the connecting rods (24) and dust particles present in the inside space of the link frame bodies through which the cable or the like is penetrated are not dispersed outside.

4 Claims, 5 Drawing Sheets

CABLE OR THE LIKE PROTECTION AND GUIDE DEVICE

This patent application includes a claim of foreign priority to prior filed Japanese Patent Application 2002-346154 filed Nov. 28, 2002.

TECHNICAL FIELD TO WHICH THE INVENTION PERTAINS

The present invention relates to a cable or the like protection and guide device, and more specifically relates to a cable or the like protection and guide device, which hermetically seals a cable or the like inside.

RELATED ART

This kind of cable or the like protection and guide devices each include a row of link frame bodies formed by arranging a plurality of link frame bodies adjacently in a row and pin-connecting said link frame bodies (see for example, Patent Reference 1).

In the respective link frame bodies, a plurality of link frame bodies are adjacently arranged in a row, and front ends of a link frame body and read ends thereof are connected to rear ends and front ends of the adjacent link frame bodies respectively. Each link frame body includes a pair of link plates arranged in parallel and connecting rods, which connect to these link plates. Further each link frame body has an inner space formed by these link plates and connecting rods. A cable or the like penetrated through a tunnel formed in the inner space in a row of the link frame bodies.

In this cable or the like protection and guide device one connecting rod of each link frame body can be opened or closed and by opening/closing this connecting rod the cable or the like can be easily incorporated into the tunnel. The opening/closing of the connecting rod is performed by connecting one end of the connecting rod to one link plate with a hinge and pivoting the connecting rod about a pin. When the one end of the connecting rod is closed, the other end of the connecting rod is press fit into an engagement portion of the link plate so that the connecting rod is secured to the link frame body.

There has been provided another cable or the like protection and guide device, in which a plurality of link frame bodies are adjacently arranged in a row to form a row of link frame bodies, each link body comprises a base and a cover having U-shaped cross-sections, opening surfaces are connected to each other in an opposed manner, and a cable or the like is penetrated through an inner space formed by the cover and the base (see for example Patent Reference 2).

In this cable or the like protection and guide device, the connection between the base and cover is performed by fitting a pawl on a lower end of a leg portion extending from a lower end of a cover side wall to a base side wall to a groove on the base side wall.

Patent Reference 1 is Japanese Patent Laid-open Publication No. 2000-55140.

Patent Reference 2 is U.S. Pat. Specification No. 3,779,003

Problems to be Solved by the Invention

However, in these cable or the like protection and guide devices, wear particles generated by friction between cables or the like arranged inside the link frame bodies or friction between a cable or the like and an inner surface of a link plate, are dispersed outside. Thus these cable or the like protection and guide devices are not suitable for using in environment where dust particles are problems such as a clean room.

In the former cable or the like protection and guide device one of the connecting rods is pivoted about a hinge using it as a fulcrum and the hinge holds the center of the connecting rod with a hinge. Thus, the cable or the like protection and guide device needs a gap between the connecting rod and a one end of the link plate. Further, when a row of the link frame bodies is moved the link frame bodies are distorted by external force whereby the gap is increased. Further, when the row of the link frame bodies in the cable or the like protection and guide device is moved, wear particles are generated inside the row of the link frame bodies by friction between the cables or the like disposed in the link frame bodies or friction between the cable or the like and inner surfaces of the link frame bodies. The wear particles are dispersed from a gap between the link plate and the connecting rod to outer portions. Thus the former cable or the like protection and guide device is not suitable for using in environment where dust particles are problems.

Alternatively, in the latter cable or the like protection and guide device, even if the cover is connected by fitting between the pawl and the groove, the wear particles generated by friction between the cables or the like disposed in the link frame bodies or friction between the cable or the like and inner surfaces of the link frame bodies, are dispersed from a gap between a cover side wall and a base side wall to the outside. Further, since in a curved section of the cable or the like protection and guide device a link frame body forms a large gap between the link frame body and an adjacent link frame body, the latter cable or the like protection and guide device is not suitable for using at all in environment where dust particles are problems such as a clean room.

Accordingly, the object of the present invention is to provide an improved cable or the like protection and guide device in which dust particles such as wear particles do not disperse outside.

Means for Solving the Problems

To attain the above-mentioned object a cable or the like protection and guide device in which a plurality of link frame bodies articulably connected to each other in the longitudinal direction in a state where said cable or the like was accommodated in a hermetically sealed manner, comprises a pair of link plates disposed on both sides of said cable or the like and connecting rods respectively bridged on the bend or articulation outer peripheral side and on the bend or articulation inner peripheral side of said link plate, is characterized in that between at least a bend or articulation outer peripheral side of said link plate and said connecting rod bridged at on the bend or articulation outer peripheral side is openably provided a sealing structure by a concave and convex fitting.

Action

In a cable or the like protection and guide device of the present invention, in which a plurality of link frame bodies articulably connected to each other in the longitudinal direction in a state where said cable or the like was accommodated in a hermetically sealed manner, comprises a pair of link plates disposed on both sides of said cable or the like and connecting rods respectively bridged on the bend or articulation outer peripheral side and on the bend or articulation inner peripheral side of said link plate, between at least a bend or articulation outer peripheral side of said link plate and said connecting rod bridged at on the bend or articulation outer peripheral side is openably provided a sealing structure by a concave and convex fitting.

Accordingly, the respective link frame bodies are reliably hermetically sealed by connecting rods and no dust particles such as wear particles in a space of the inside of the link frame bodies through which cables or the like are penetrated disperse outside.

The invention will be better understood when reference is made to the BRIEF DESCRIPTION OF THE DRAWINGS, DETAILED DESCRIPTION OF THE INVENTION and CLAIMS which follow hereinbelow.

Figure 1:
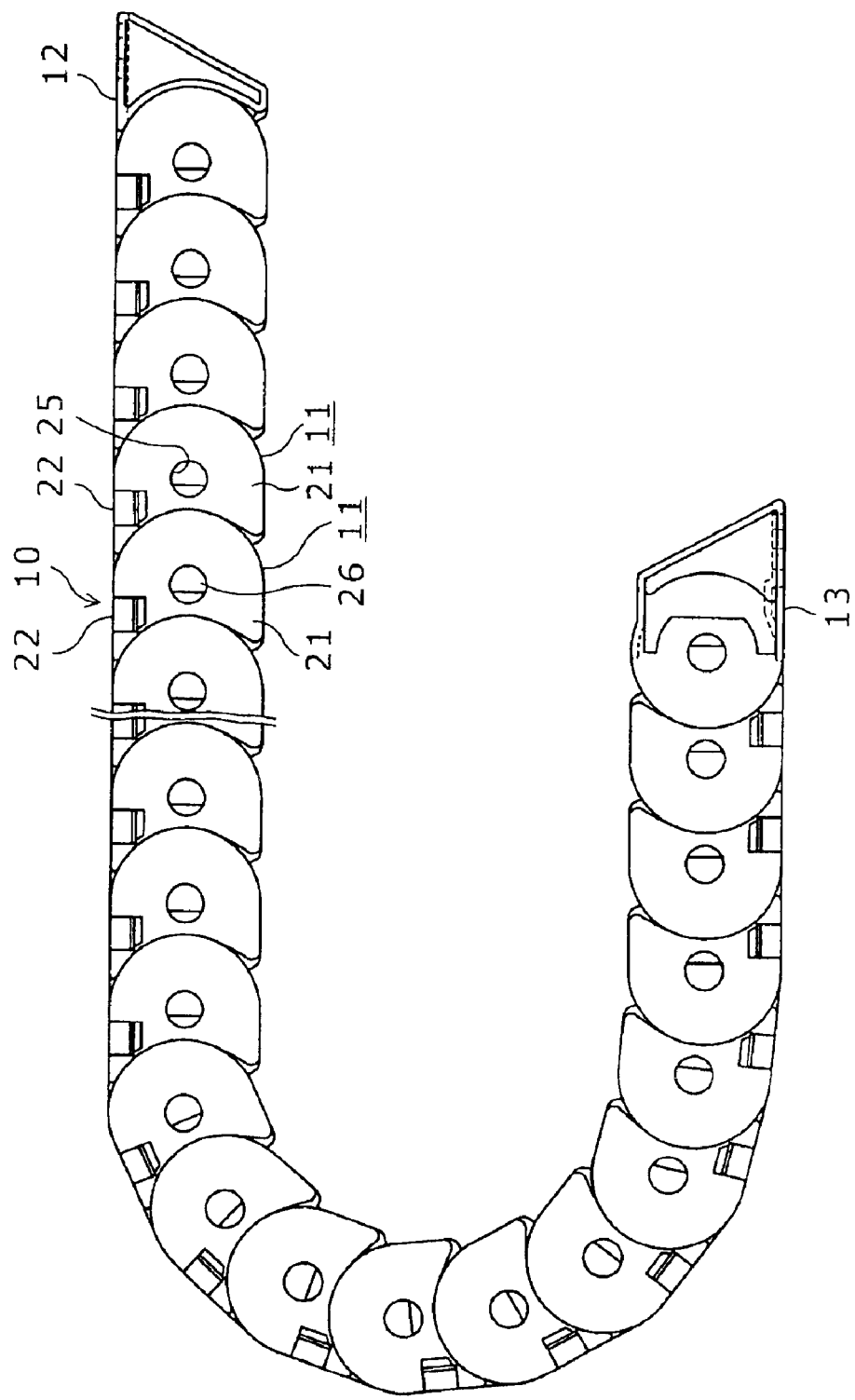
FIG. 1 is a side view showing one example of a cable or the like protection and guide device according to the present invention.

A better understanding of the invention will be had when reference is made to the DETAILED DESCRIPTION OF THE INVENTION and CLAIMS which follow hereinbelow.

DETAILED DESCRIPTION OF THE INVENTION

Embodiments of the Invention

In an embodiment of the present invention, a sealing structure comprises a convex portion of said connecting rod provided on one of an edge portion of said connecting rod, which faces said link plate, and a region of said link plate, which is complementary to said edge portion of the connecting rod, and a concave portion provided complementarily on the other of said edge portion of the connecting rod and said region of the link plate. In such a cable or the like protection and guide device, when connecting rods bridge across the link frame bodies, the concave and convex portions are fitted and hermetically sealed to each other by elastic deformation of the link plates or the connecting rods or both of them and labyrinths are formed therebetween. Thus, dust particles such as wear particles are not dispersed from gaps between the link frame bodies and connecting rods.

In this embodiment, in a case where the convex portion and the concave portion is fitted to each other in a tapered manner, when the connecting rod is bridged across the link frame bodies, the link plates or the connecting rod or both of them be elastically deformed so that the connecting rod is strongly attached to the link plates and more complicated labyrinths are generated between the connecting rod and the link plates. Accordingly, dust particles such as wear particles do not further disperse outside.

Further, when a sealing structure includes pawls provided on the connecting rod and pawl grooves, which engage the pawls, provided in the link plates, the connecting rod is strongly attached to the link frame bodies by the paws and the pawl grooves. Therefore, dispersion of wear parts from between the link bodies and the connecting rod can be further reduced. Additionally the connecting rod can be more strongly connected to the link plates, and even if the link plates and the connecting rod are distorted by external force, no gap is produced between the connecting rod and the link plates. Then wear parts do not disperse outside.

Furthermore, when the sealing structure includes a sealing material between the convex portion of the connecting rod and the concave portion of the link plate, the inner space formed by the link plates and the connecting rods can be more reliably sealed. Thus, no dust particles such as wear particles disperse to outer space at all.

Examples of cable or the like protection and guide devices of the present invention will be described below with reference to attached drawings.

A cable or the like protection and guide device shown FIGS. 1 to 6 has a structure in which a cable or the like is hermetically accommodated, and is used in for example a clean room or the like.

This cable or the like protection and guide device includes a row 10 of link frame bodies. The row 10 of link frame bodies comprises a plurality of link frame bodies 11. The link frame bodies 11 are arranged in a row and pin connected to each other. A movable side fitting 12 is pin connected to a link frame body 11 on one end of the row 10 of the link frame bodies, and a fixed side fitting 13 is pin connected to a link frame body 11 on the other end thereof. The movable side fitting 12 is secured to a movable side device and the fixed side fitting 13 is fixed to a secured side device, and the middle portion of the row 10 of the link frame bodies 11 are bent or articulated.

Figure 2:
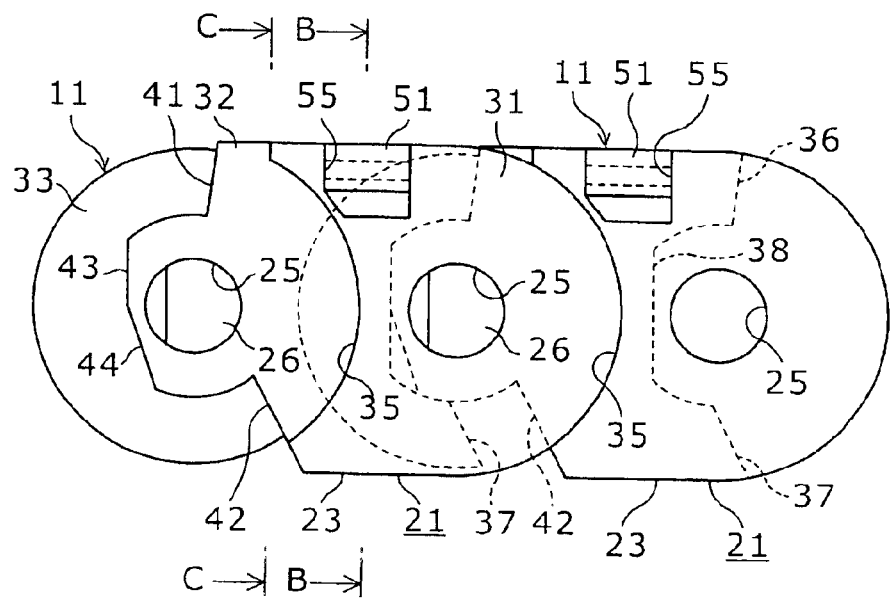
FIG. 2 is an enlarged side view of link frame bodies forming the cable or the like protection and guide device shown in FIG. 1.
Figure 3:
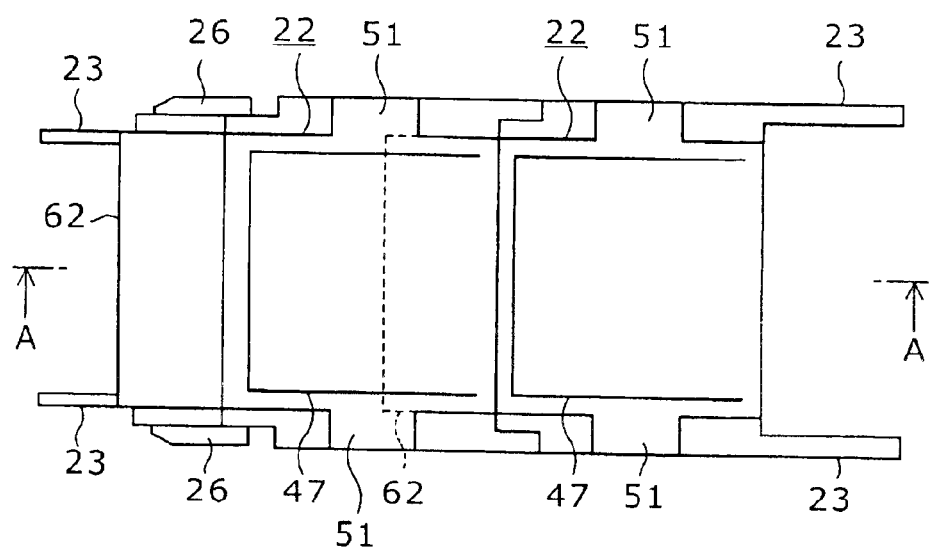
FIG. 3 is a side view of FIG. 2.
Figure 4:
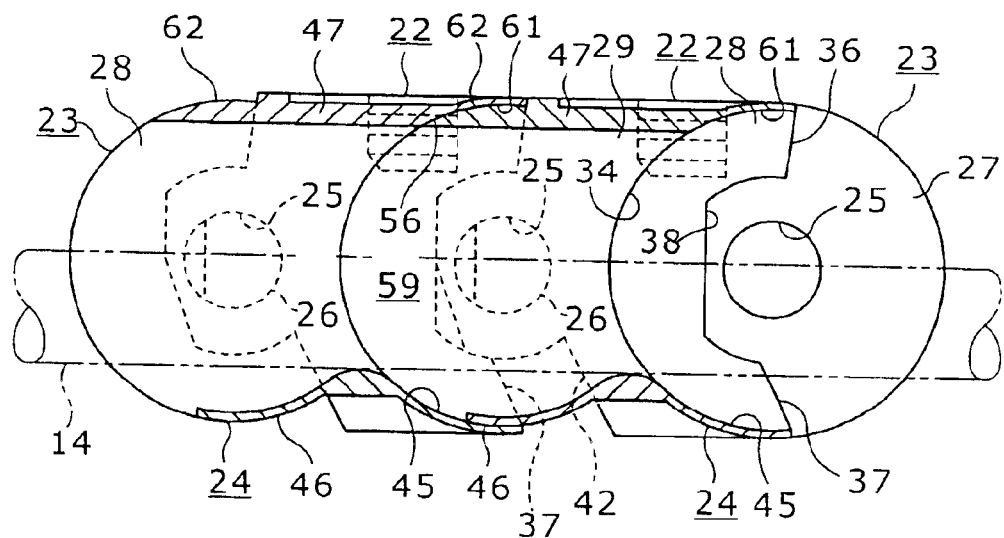
FIG. 4 is a longitudinal sectional view of the link frame bodies taken along the line A—A in FIG. 3.

FIGS. 2 to 4 show details of the link frame bodies 11. Each of the link frame bodies 11 includes a body 21 having a U-shaped cross-section and a connecting rod attached to a bend or articulation outer peripheral side of the body 21.

The body 21 is composed of a synthetic resin injection molded form and comprises link plates 23 and connecting rods 24.

The body has a pair of link plates 23, which are arranged in parallel to form a space. The link plate it self has a profile of a cocoon when viewed from a side. A distance between inner surfaces of the link plates 23 on the movable fitting 12 side or on a side toward the movable side device, that is on front portion sides of the link plates 23, is wider than a distance between outer surfaces of rear portions in the link plates 23. A pin hole 25 is provided in a front portion of the link plate 23. Further, a pin 25 is integrally formed on a rear portion of the link plate 23 so as to protrude from the outer surface.

On inner surfaces of the link plate 23 are formed inner step walls 27 to 29 as shown in FIG. 4. On outer surfaces of the link plate 23 are formed outer step walls 31 to 33 as shown in FIG. 2. The inner step wall 29 has an inner arc-shaped surface 34 having a pin hole and the central axis coaxially as shown in FIG. 4. The radius of the inner arc-shaped surface 34 is larger than that of the front portion profile of the link plate 23. The outer step wall 31 on a rear portion of the link plate 23 has an outer arc-shaped surface 35 having a pin hole and the central axis coaxially as shown in FIG. 2. The radius of the outer arc-shaped surface 35 is larger than that of the front portion profile of the link plate 23.

The inner step wall 28 includes a front edge consisting of restricting surfaces 36 to 38, which form a rotational angle restricting portion of the link frame body 11. The restricting surfaces 36 and 37 extend radially with respect to the central axis of the pin hole 25, and the restricting surface 38 is disposed vertically. One end of the restricting surface 38 and the restricting surface 36 and the opposite end of the restricting surface 38 and the restricting surface 37 are connected to each other by arc-shaped surfaces coaxially having the pin hole 25 and the central axis, respectively. Further, the outer step wall 32 includes a rear edge consisting of restricting surfaces 41 to 44, which form a rotational angle of an adjacent link body 11. The restricting surfaces 41 to 44 are configured such that they have complementary shapes to the restricting surfaces 36 to 38 on the front portion of the link plate 23. That is the restricting surfaces 41 to 43 are symmetrically disposed to the restricting surfaces 36 to 38 forming a front edge of the inner step wall 28. However, a part of the restricting surface 43 is a slant face, which is inclined forward the link frame body 11.

Between front inner surfaces of the link plates 23 is fitted an adjacent link frame body on the front side and to a rear outer surface of the link plate is fitted the front portion of the link plate 23 in an adjacent link frame body 11 on the rear side. The inner step wall 27 of the link plate 23 is fitted to the outer step wall 32 of the adjacent link frame body 11 on the front side, the inner step wall 28 of the link plate 23 is fitted to the outer step wall 33 of the adjacent link frame body 11 on the front side, and the pin hole 25 is fitted onto the pin 26 of the adjacent link frame body 11 on the front side. The outer step wall 32 is fitted to the inner step wall 27 of the adjacent link frame body 11 on the rear side, the outer step wall 33 is fitted to the inner step wall 28 of the adjacent link frame body 11 on the rear side, and the pin 26 is fitted into the pin hole of the adjacent link frame body 11 on the front side. And the restricting surface 36 contacts the restricting surface 41 of the adjacent link frame body 11 on the front side and the restricting surface 38 contacts only the restricting surface 43 of the adjacent link frame body 11 on the front side. This contact blocks counterclockwise rotation in each link frame body 11 in FIG. 4. It is noted that arc surfaces connecting between the restricting surface 38 and the restricting surface 36 and between the restricting surface 38 and the restricting surface 37, contact the arc surfaces connecting between the restricting surface 41 and the restricting surface 43 and between the restricting surface 42 and the restricting surface 44 in the adjacent link frame body 11 on the front side, respectively.

Figure 5:
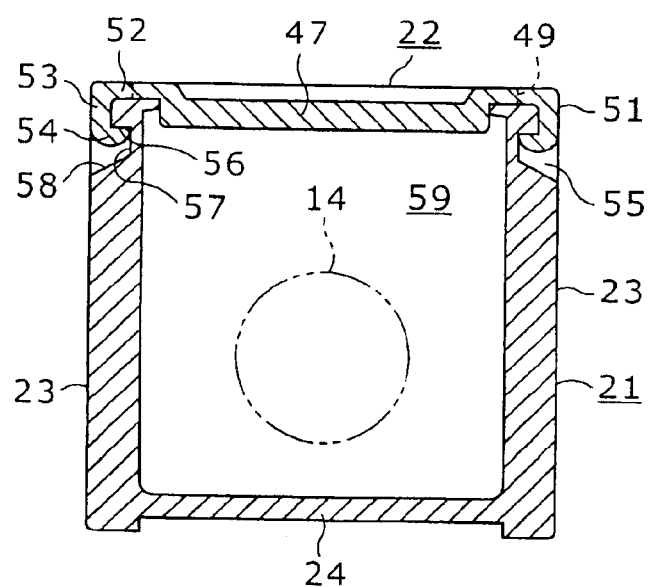
FIG. 5 is a cross-sectional view taken along the line B—B in FIG. 2.

The connecting rod 24 is disposed on the bend or articulation inner peripheral side of a link frame body 11 so as to bridge across link plates 23 as shown in FIG. 4 and both ends of the connecting rod 24 are brought into contact with the link plates 23 as shown in FIG. 5. A bend outer peripheral side of the link frame body 11 in the front portion of the connecting rod 24 is provided a front contact surface 45 and a bend inner peripheral side of the link frame body 11 in the rear portion of the connecting rod 24 is provided a rear contact surface 46. The front contact surface 45 is on an arc plane having the same central axis as the pin hole 25 and the rear contact surface 46 is on an arc plane having the same central axis as the pin 26. Further, the front contact surface 45 contacts a rear contact surface in a connecting rod 24 of the adjacent link frame body 11 on the front side, and the rear contact surface 46 contacts a front contact surface in a connecting rod 24 of the adjacent link frame body 11 on the rear side.

Further, a connecting rod 22 is disposed on a bend or articulation outer peripheral side of the link frame body 11. The connecting rod 22 is placed on an open side edge of the link frame 11 so as to bridge across the link plates 23 and is removably attached to the link plates 23 while forming a sealing structure.

Figure 6:
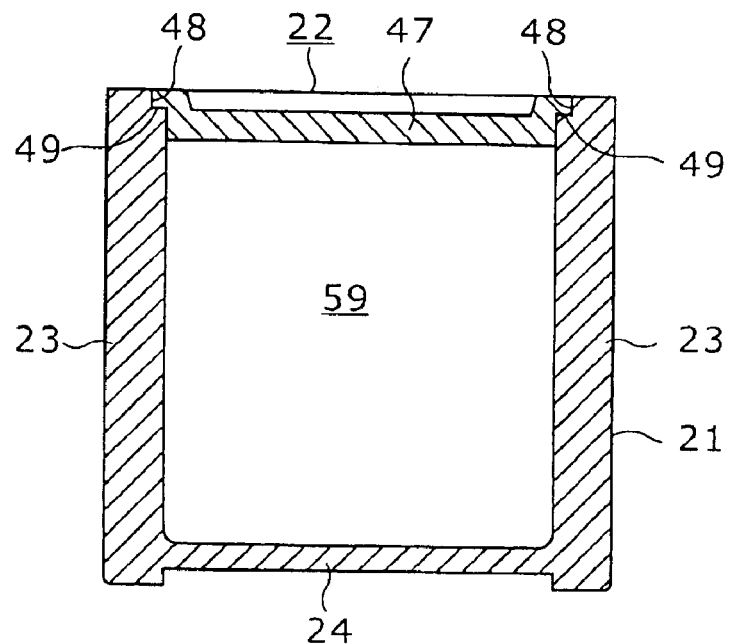
FIG. 6 is a cross-sectional view taken along the line C—C in FIG. 2.

Thus, both side edges of the connecting rod 22 extending vertically to the drawing paper of FIG. 6 are provided with convex portions 49. Each of the link plates 23 is provided with a concave portion 48. The convex portion 49 has a rectangular cross-section and is provided on the entire side edge. The concave portion 48 has a shape complementary to the cross-section of the convex portion 49.

Further, each center of both side edges of the body 47 of the connecting rod 22 is provided with a pawl 51 as shown in FIG. 5. The pawl 51 has a laid U-shaped cross section and comprises walls 52 to 54. The wall 52 extends from the convex portion 49 of the body 47 toward the outer surface of the link plate 23, the wall 53 is bent from the wall 52 in parallel with the outer surface of the link plate 23, and the wall 54 extends from the wall 53 in parallel with the wall 52. The wall 52 forms a part of the convex portion 49. A pawl groove 55 which the pawl 51 engages is provided with an outer surface of the link plate 23. The pawl groove 55 comprises a surface 56 parallel with the end surface of the convex portion 49, a surface 57, which extends from the surface 56 in parallel with an outer surface of the link plate 23, and a surface 58, which slantingly extends from the surface 57 toward the outer surface of the link plate 23.

The attachment of the connecting rod 22 onto the link plates 23 is performed by matching the pawls 51 on both side edges of the connecting rod to the pawl grooves 55 of the respective link plates 23, placing the connecting rod 22 on a bend outer peripheral end surfaces of the link plates 23, and pushing the center of the body 54 for the connecting rod 22 to fit the respective pawls 51 to the associated pawl grooves 55. When the connecting rod 22 is pushed in, the outer sides of the link plates 23 are flexed so that the distance between the link plates 23 is increased. Then, when the connecting rod 22 is inserted into the link plates 23, the pawls 51 are flexed whereby the wall 54 of each pawl 51 engages the surface 56 of the pawl groove 55. Then, when the link plate 23 is elastically restored, the convex portions 49 of the connecting rod 22 are attached to the concave portions 48 and the extended portions of the body 52 are attached to the inner surfaces of the link plates 23. Additionally the walls 53 of the pawls 51 are attached to the surfaces 56 of the pawl grooves 55.

Further, as shown in FIG. 4, the front portion of the body 47 of the connecting rod is provided with a front contact surface 61 on the bend inner peripheral side. A rear portion of the connecting rod 22 has an extended portion, extending from the body 47 toward the rear portion and having a side surface, which is attached to the inner surface of the link plate 23. A bend outer peripheral side of this extended portion is provided a rear contact surface 62. The front contact surface 61 forms a part of an arc surface having the same central axis as the pin hole 25, and the rear contact surface 62 forms a part of an arc surface having the same central axis as the pin 26. The front contact surface 61 contacts a rear contact surface of the adjacent link frame body 11 on the front side, and the rear contact surface 62 contacts a front contact surface of the adjacent link frame body 11 on the rear side.

This cable or the like protection and guide device is used in for example a robot provided in a clean room. The cable or the like protection and guide device is disposed between a movable base on which the robot is placed and a power source device. A movable side fitting 12 is secured onto the movable base, and a fixed side fitting 13 is secured to the power source device. A cable or the like 14 is for example a power supply cable. The power source cable 14 is penetrated through a cable accommodation space or a tunnel 59 formed by an inside space surrounded by the body 21, and the connecting rods 22 and 24, as shown in FIG. 4. One of the penetrated ends is connected to a driving source for the robot and the other thereof is connected to the earth for the power source device or the like.

The insertion of the power source cable 14 is performed by removing the pawls 51 from the pawl grooves 55, removing the connecting rod 22 from the bodies 21 of the respective link frame bodies 11, then dropping the power source cable 14 into a space of the link plate 23 through an opening formed of a row 10 of the link frame body and fitting the connecting rods 22 to the bodies 21 of the respective link frame bodies 11 to cause the pawls 51 to engage the pawl grooves 55. By this steps the cable 14 is covered and protected by the link plates 23 and the connecting rods 22 and 24.

When a robot is moved together with the movable base, the link frame body 10 is moved in accordance with strokes while bending or articulating to follow the movement of the movable base. Then, the cable 14 slides on the link plates 23 or connecting rods 22, 24, which form the body 21 or on all members, so that the link plates 23, connecting rods 22, 24 or the cover of the cable 14 or all members wear.

Then, a front contact surface 45 of the contact rod 24 contacts a rear contact surface 46 of the adjacent link frame body 11 on the front side and the rear contact surface 46 contacts a front contact surface 45 of the adjacent link frame body 11 on the rear side. Further, a front contact surface 61 of the connecting rod 22 contacts a rear contact surface 62 of the adjacent link frame body on the front side and the rear contact surface 62 contacts the front contact surface 61 of the adjacent link frame body on the rear side. Even if the link frame body 11 is rotated about the pin 26 in a bend section, the contact is maintained. Since the tunnel 59 in the row 10 of the link frame bodies is always hermetically sealed from outside by the contact, dust particles such as wear particles generated in the link frame bodies do not disperse.

Further, in the cable or the like protection the convex portions 49 of the connecting rod 22 are fitted to the concave portions 48 of the link plate 23, and labyrinths are formed therebetween. Since these labyrinths are formed over the entire side edges of the bodies 52 of the connecting rods 22, even if the connecting rods 22 can be removed from the bodies 21, dust particles do not disperse from therebetween to the outside. Further, even if the link bodies 111 are distorted by external force during movement of the row 10 of the link frame bodies, the connecting rods 22 are not disconnected from the bodies 21 because the connecting rods 22 are connected to the bodies 21 by the pawls 51 and pawl grooves 55. Accordingly, no gap is produced between the bodies 21 and the connecting rods 22, and then dust particles in the tunnel 59 of the row 10 of the link frame bodies do not disperse to the clean room.

Figure 7:
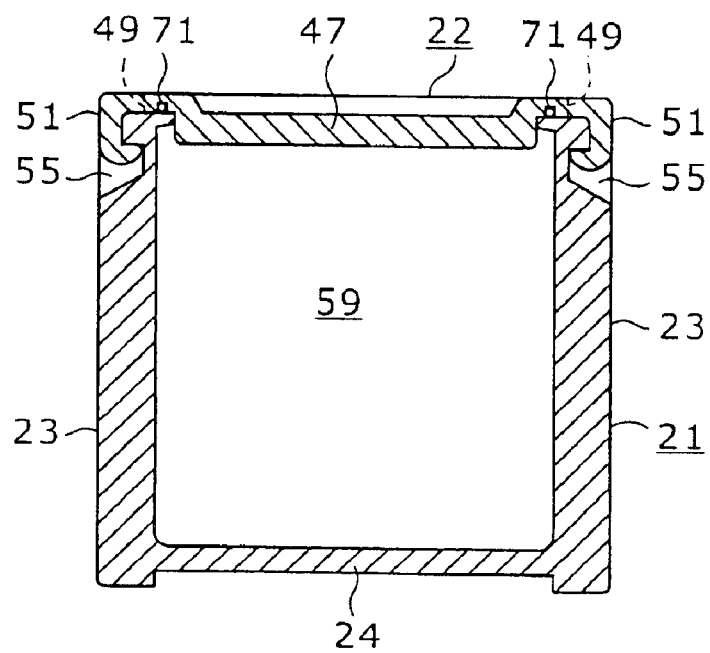
FIG. 7 is a cross-sectional view of a link frame body forming another example of a cable or the like protection and guide device according to the present invention.

FIG. 7 shows another example of a cable or the like protection and guide device according to the present invention. This cable or the like protection and guide device shown in FIG. 7 has an only different sealing structure in which a connecting rod on the bend outer peripheral side of a link frame body is attached to a base body, as compared with the cable or the like protection and guide device described with reference to FIGS. 1 to 6. FIG. 7 shows the same part as FIG. 5.

Like the cable or the like protection and guide device described with reference to FIGS. 1 to 6, the connecting rod is closely fitted to a body 21 by fitting convex portions 49 on both side edges of the connecting rod 22 into concave portions 48 on the inner surfaces of a link plates 23 of the body 21, and even if the body 21 is distorted since the pawls 51 of the connecting rods 22 engage the pawl grooves 55 in the link plates 23, the closely fitting between the convex portion 49 and the concave portion 48 can be maintained.

In this cable or the like protection and guide device shown in FIG. 7 the connecting rod 22 is attached to the body 21 through an elastic material 71. That is a surface of the connecting rod, which faces the link plate 23, is provided with a groove at a position associated with the pawl 51, and the elastic material 71 is inserted into the groove. The elastic material may be made of for example rubber or soft synthetic resin having a circular cross-section and is arranged between the connecting rod 22 and the body 21 in a compressed manner.

In such a cable or the like protection and guide device, when the connecting rod 22 is removed, one pawl 51 is first disengaged and the other pawl 51 is disengaged. However, at the same time when the other pawl 51 is disengaged, the elastic material 71 is elastically restored to push up the connecting rod 22 and maintain this state whereby the pawl 51 is not engaged with the pawl groove 55. Thus, the other pawl 51 can be easily disengaged. And when the connecting rod 22 is attached to the body 21, the elastic material 71 is elastically restored to strongly push the pawl 51 to the pawl groove 52. Thus, when the link frame body 11 is distorted, the removal of the connecting rod from the body 21 cab be reliably prevented.

Figure 8:
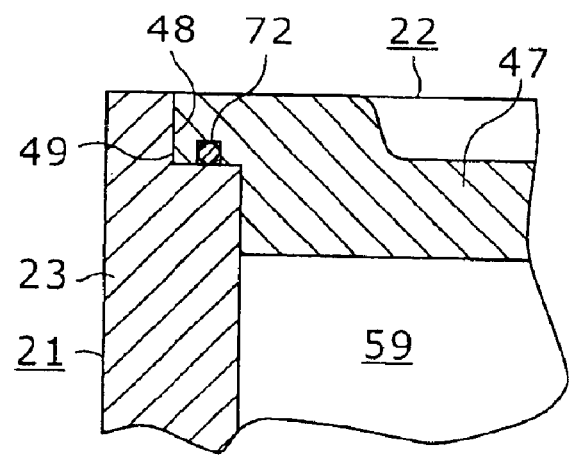
FIG. 8 is a partially enlarged cross-sectional view of a link frame body forming still another example of a cable or the like protection and guide device according to the present invention.

FIG. 8 shows another example of a cable or the like protection and guide device according to the present invention. This cable or the like protection and guide device shown in FIG. 8 also has only an different sealing structure in which a connecting rod on the bend outer peripheral side of a link frame body is attached to a body of a link frame body, as compared with the cable or the like protection and guide device described with reference to FIGS. 1 to 6. FIG. 8 shows an associated portion with the portion shown in FIG. 6 in an enlarged manner.

A body 21 and a connecting rod 22 of a link frame body 111 are configured in the same manner as in the cable or the like protection and guide device described with reference to FIG. 7. However, a close adhesion surface between a convex portion 49 and a concave portion 48, for example a surface of the convex portion 49 on a bend inner peripheral side of the link frame body 11, is provided with a sealing groove. The sealing groove is formed along the entire side edge in the longitudinal direction of a connecting rod body. A sealing material is inserted into the sealing groove. The sealing material 72 is a bar, a rod or a sheet having a circular or rectangular section or the like. The sealing material 72 shown in FIG. 8 consists of a bar or rod having a circular section. A tunnel 59 formed by the body 21 and the connecting rod 22 in a row of the link frame bodies is hermetically sealed not only by the close fitting between the convex portion 49 and the concave portion 48 but also by the sealing material 72.

In such a cable or the like protection and guide device, by the fitting between the convex portion 49 and the concave portion 48 the dispersion of wear particles between the body 21 and the connecting rod 22 is small. Even if the link frame bodies are distorted by external force, no gap between the body 21 and the connecting rod 22 is produced. Additionally, the sealing material 72 seals the gaps between the side edges of the connecting rods and the link plate 23 whereby the inside space formed by the body 21 and the connecting rod 22 is further reliably hermetically sealed. Accordingly, dust particles such as the wear particles do not disperse to the outside space at all.

It is noted that in this cable or the like protection and guide device, not only by causing the sealing material to have only a sealing function but also by causing it to have the same elastic performance as the cable or the like protection and guide device described with reference to FIG. 7, not only the hermetic sealing properties of the link frame body 11 is improved but also an operation of disengaging the pawl and resistance to distortion can be improved.

Figure 9:
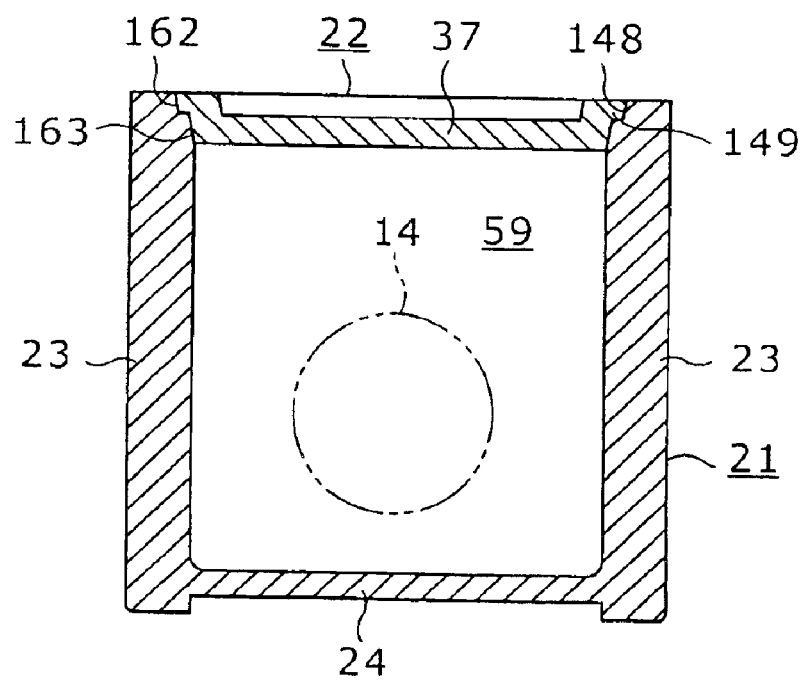
FIG. 9 is a cross-sectional view of a link frame body forming still another example of a cable or the like protection and guide device according to the present invention.

FIG. 9 shows another example of a cable or the like protection and guide device according to the present invention.

This cable or the like protection and guide device shown in FIG. 9 also has only an different sealing structure in which a connecting rod on the bend outer peripheral side of a link frame body is attached to a base body, as compared with the cable or the like protection and guide device described with reference to FIGS. 1 to 6. FIG. 9 shows an associated portion with the portion shown in FIG. 6.

Both side edges of a connecting rod 22 include convex portions 149, and inner surfaces of the link plates 23 include concave portions, which engage the convex portions 149, in the ends on the bend outer peripheral side. A surface 162 of the convex portion 149, facing an inner surface of the link plate 23 is a slant face, which is inclined toward the bend inner peripheral side or a connecting rod 24. A surface in the concave portion 148, associated with the slant face of the convex portion 149 is formed to be a slant face having the same angle of inclination as the slant face 162 of the convex portion 149. Further, in this cable or the like protection and guide device, a surface 163 forming the convex portion 149 at the side edge of the connecting rod 22 and an inner surface of the link plate 23 are formed to be slant faces, which is parallel to the slant face 162.

The attachment of the connecting rod 22 to the body 21 is performed, as in the cable or the like protection and guide device described with reference to FIGS. 1 to 6, by matching the pawls on both side edges of the connecting rod 22 to the pawl grooves of the respective link plates 23, placing the connecting rod 22 on the link plates and pushing the center portion of the body 47 in the connecting rod 22. When the connecting rod 22 is pushed in, the pawls are opened and engage the pawl grooves and at the same time the link plate 23 is flexed so that the convex portions 149 is led to the concave portions 148. After that the link plate 23 is elastically restored, the pawls engage the pawl grooves, and the concave portions 148 engage the convex portions 149 so that the slant faces 162 of the convex portions 149 are closely adhered to the associated slant faces of the concave portions 148. At the same time the slant faces 163 forming ends of the connecting rod 22 are closely adhered to the associated slant faces of the concave portions 148.

In such a cable or the like protection and guide device, when the connecting rods 22 are fitted to the bodies 21, the slant faces 162, 163 of the convex portions 149 are strongly closely adhered to the associated slant faces of the concave portions 148. That is the connecting rod is taper-fitted onto the body 21, and between the convex portion 149 and the concave portion 148 are formed further complicated labyrinths. The labyrinths are formed over the entire side edge of the body 52 of the connecting rod 22. Thus, even if the connecting rod is disengageable with respect to the body 21, the tunnel 59, formed in a row of the link frame bodies, which accommodates the cable or the like 14, is reliably sealed from the outside space, and dust particles such as wear particles present in the tunnel are not dispersed outside.

Further, in this cable or the like protection and guide device, even if the link bodies 11 are distorted by external force during movement of the row 10 of the link frame bodies, the connecting rods 22 are not disconnected from the bodies 21 because the connecting rods 22 are connected to the bodies 21 by the pawls and pawl grooves. Accordingly, no gap is produced between the bodies 21 and the connecting rods 22, and then dust particles in the tunnel 59 of the row 10 of the link frame bodies do not disperse to the clean room.

In example described above, the row 10 of the link frame bodies is a structure in which link frame bodies are pin connected to each other, that is a structure, in which the pins 26 of the respective link frame bodies 11 are fitted to pin holes of adjacent link frame bodies on the front side and the pin holes 25 are fitted onto pins of adjacent link frame bodies on the rear side. However, the present invention is not limited to only the row of the link frame bodies and it may adopt rows of link frame bodies having other configurations. For example, a row of link frame bodies in which the connecting rods of the respective link frame bodies are fitted to connecting grooves of adjacent link frame bodies on the front side and connecting grooves are fitted onto connecting rods of adjacent link frame bodies on the rear side, may be used.

Effects of the Invention

As mentioned above, in the cable or the like protection and guide device of the present invention in which a plurality of link frame bodies articulably connected to each other in the longitudinal direction in a state where the cable or the like was accommodated in a hermetically sealed manner, comprises a pair of link plates disposed on both sides of the cable or the like and connecting rods respectively bridged on the bend or articulation outer peripheral side and on the bend or articulation inner peripheral side of said link plate, between at least a bend or articulation outer peripheral side of the link plate and the connecting rod bridged at on the bend or articulation outer peripheral side is openably provided a sealing structure by a concave and convex fitting. Accordingly, the respective link frame bodies are reliably hermetically sealed by connecting rods and dust particles present in the inside space of the link frame bodies, through which the cable or the like is penetrated, do not disperse outside. Therefore the cable or the like protection and guide device of the present invention can be safely used even in environment such as a clean room or the like.

Description of Reference Numerals

11 . . . Link frame body
14 . . . Cable or the like
22 . . . Connecting rod on a bend outer peripheral side
23 . . . Link plate
24 . . . Connecting rod on a bend inner peripheral side
48, 49, 148, 149, 148, 149 . . . Concave and convex fitting portion The invention has been described by way of examples only and those skilled in the art will readily recognize that certain changes and modifications may be made to the examples without departing from the spirit and scope of the appended claims.

I claim:

1. A cable protection and guide device comprising: a plurality of link frame bodies articulably connected to each other; each said link frame body comprises first and second link plates respectively disposed on each side of a cable; a first connecting rod interconnecting said first and second link plates to each other at an inner peripheral extent of said first and second link plates; a second connecting rod interconnecting said first and second link plates to each other at an outer peripheral extent of said first and second link plates; said first and second connecting rods extend between adjacent link frame bodies; said second connecting rod includes a first end having a first convex portion thereon and a second end having a second convex portion thereon; said first side plate includes a first concave portion proximally residing at the outer peripheral extent thereof; said second plate includes a second concave portion residing at the outer peripheral extent thereof; a first seal interposed between said first convex portion of said first end of said second connecting rod and said first concave portion of said first side plate; a second seal interposed between said second convex portion of said second end of said second connecting rod and said second concave portion of said second side plate; said first and second convex portions of said second connecting rod engaging said first and second concave portions of said first and second side plates; and, said first and second side plates in combination with said first and second connecting rods completely enclosing and sealing the cable such that dust or particles do not escape from said cable protection and guide device.

2. A cable protection and guide device as claimed in claim 1 wherein said second connecting rod includes a pawl on each end thereof and each of said side plates includes a pawl groove therein, and wherein said pawls engage said pawl grooves.

3. A cable protection and guide device as claimed in claim 2 wherein said convex portions and said concave portions are fitted into each other in a tapered manner.

4. A cable protection and guide device as claimed in claim 1 wherein said seals are an elastic material.

* * * * *

UNITED STATES PATENT AND TRADEMARK OFFICE
CERTIFICATE OF CORRECTION

PATENT NO. : 6,925,795 B2
DATED : August 9, 2005
INVENTOR(S) : Komiya

It is certified that error appears in the above-identified patent and that said Letters Patent is hereby corrected as shown below:

Column 7,
Line 55, after "bodies" delete "111" and insert -- 11 --.

Column 8,
Line 49, after "body" delete "111" and insert -- 11 --.

Signed and Sealed this

Sixteenth Day of May, 2006

JON W. DUDAS
*Director of the United States Patent and Trademark Office*